United States Patent [19]
Schroeder

[11] Patent Number: 6,099,009
[45] Date of Patent: Aug. 8, 2000

[54] TWO WHEEL DRIVE FOR BICYCLE

[76] Inventor: Karl S. Schroeder, 6822 Salem Ave., Clayton, Ohio 45315

[21] Appl. No.: 09/107,395

[22] Filed: Jun. 30, 1998

Related U.S. Application Data

[60] Provisional application No. 60/053,912, Jul. 28, 1997.

[51] Int. Cl.[7] .................................................... B62M 1/12
[52] U.S. Cl. .......................................... 280/234; 280/250
[58] Field of Search .................................. 280/230, 233, 280/234, 235, 242.1, 244, 246, 247, 248, 249, 250

[56] References Cited

U.S. PATENT DOCUMENTS

| | | |
|---|---|---|
| 564,099 | 7/1896 | Pritchett . |
| 2,533,728 | 11/1950 | Gedat et al. . |
| 3,193,305 | 7/1965 | Hendricks . |
| 4,773,662 | 9/1988 | Phillips .................................... 280/234 |
| 5,908,199 | 6/1999 | Rigato ..................................... 280/233 |

*Primary Examiner*—Kevin Hurley
*Attorney, Agent, or Firm*—William Weigl

[57] ABSTRACT

A bicycle has separate chain-and-sprocket drive mechanisms for the front and rear wheels. The front wheel drive includes a cross shaft and a pair of crank arms at the ends of the cross shaft, both of which crank arms extend in the same radial direction from the cross shaft. The cross shaft and crank arms serve the dual function of enabling steering the bicycle similarly to conventional handlebars and also driving the chain-and-sprocket mechanism for the front wheel. At the ends of the crank arms, a pair of outwardly-directed diametrically-opposed axles form bearing surfaces for a pair of freely rotatable hand grips. A drive sprocket on the cross shaft is rotated by cranking the hand grips in a continuous 360 degree rotary motion, and through the chain, driving a driven sprocket associated with the front wheel. A clutch is provided to lock the cross shaft in any of a plurality of angular positions to enable the drive to be declutched from a driving relationship with the front wheel and used solely for steering. A first lever system is actuated by sliding one of the hand grips axially to operate the clutch, and a second lever system is actuated through conventional lever and cable means from the other of the hand grips for actuating caliper brakes for both wheels. Inboard hand grips are provided on the cross shaft for steering and for enabling performing the brake operation through the second lever system while steering from the inboard grips.

18 Claims, 2 Drawing Sheets

TWO WHEEL DRIVE FOR BICYCLE

This invention relates generally to a bicycle having a separate drive mechanism for both its front and rear wheels, and in particular to improvements in front wheel clutching and two wheel braking controls to enable their independent operations directly from the hand grips of the steering mechanism. The bicycle may be leg driven conventionally from the rear wheel alone, arm driven from the front wheel alone, or leg and arm driven from both wheels simultaneously. This application is based on my U.S. Provisional Patent Application Ser. No. 60/053,912 filed Jul. 28, 1997.

BACKGROUND OF THE INVENTION

The U.S. patent art illustrates bicycles having both independent and interconnected drives to the front and rear wheels, drives solely for driving the front wheel by one's arms and tandem drives for the rear wheel operable by the bicycler's legs and arms. Representative patents are:

U.S. Pat. No. 5,431,614, granted to Jeranson on Jul. 11, 1995, which illustrates a set of auxiliary handlebars for providing chain and sprocket drive to the front wheel by means of an up-and down arm pumping action through a pair of one way clutches. The front wheel can be driven simultaneously with the rear wheel or independently thereof.

U.S. Pat. No. 5,308,097, granted to Bono on May 3, 1994, which illustrates a reciprocating handlebar operation for a freewheeling front wheel through either a linear or a continuous chain. In essence, Bono teaches a ratcheting-type of drive in which motion is imparted to the wheel while pulling the handlebars toward one's self, but the drive is disconnected during the return stroke of the handlebars and chain to their original positions. The handlebars may be latched in a fixed position whenever the arms are not being used to help propel the bicycle.

U.S. Pat. No. 5,383,676, granted to Valentino on Jan. 24, 1995 shows a tricycle having a drive solely for the front wheel drive. Since a freewheeling front wheel drive similar to a conventional rear wheel drive is used, there is no need for a clutching device to lock the handlebars.

U.S. Pat No. 5,082,302, granted to Nacar on Jan. 21, 1992. This patent illustrates two drives for the rear wheel, one drive being the conventional rear wheel leg pumping drive and the other being an arm cranking drive through a rotation of the handlebars and a second set of chains and sprockets to assist the leg drive to the rear wheel. Overrunning clutches enable freewheeling of either the leg or arm drives.

These and yet other bicycles appear to have found but limited use, perhaps because of their complexity and the attendant cost that goes with complexity.

SUMMARY OF THE INVENTION

A bicycle has separate chain-and-sprocket drive mechanisms for the front and rear wheels. The front wheel drive consists of handlebars which include a cross shaft, a pair of crank arms fixed to the ends of the cross shaft and a pair of outwardly-directed axles at the distal ends of the crank arms which enable hand gripping of the handlebars. Both crank arms extend in the same radial direction from the cross shaft and the axles are in coaxial alignment. The cross shaft, crank arms and axles serve the dual functions of enabling steering the bicycle similarly to conventional handlebars while also driving the chain-and-sprocket mechanism for the front wheel. The axles form bearing surfaces for a pair of freely rotatable hand grips. A drive sprocket on the cross shaft is rotated by cranking the hand grips in a continuous rotary motion and, through the chain, operating a driven sprocket associated with the front wheel. Torque is therefore applied by the arms for a full 360 degrees. A clutch is provided to lock the cross shaft in any of a plurality of angular positions to enable the drive to be declutched from a driving relationship with the front wheel and to use the handlebars solely for steering. A first lever system is actuated by sliding one of the hand grips axially to operate the clutch, and a second lever system is actuated through conventional lever and cable means from the other of the hand grips for actuating caliper brakes for both wheels. Hand grips may also be provided on the cross shaft for inboard steering purposes. Brake operation can be performed from either the inboard or outboard hand grip on the same side of the handlebars.

A principal object of the invention is to provide a novel control system for operating the clutch and brake mechanisms of a front wheel drive mechanism for a bicycle from the handlebars while simultaneously allowing front wheel steering.

Another object is to provide a novel clutch system for the front wheel drive of a dual drive for a bicycle, wherein teeth of a sprocket are utilized as an element of the clutch.

A further object is to provide a simpler and therefore less costly system for driving the front wheel of a dual drive bicycle, enabling either drive to be used separately or both drives to be used in conjunction.

Another object is to position the handlebars in any angular relation to the rider when the bicycle is driven solely from the rear wheels and the handlebars are used solely for steering.

Still another object is to provide a two wheel bicycle drive in which both the legs and arms can apply torque through a full 360 degree cranking motion.

Other objects and advantages will become apparent from the following description, in which reference is made to the accompanying drawings.

DESCRIPTION OF THE PREFERRED EMBODIMENT

Figure 1:
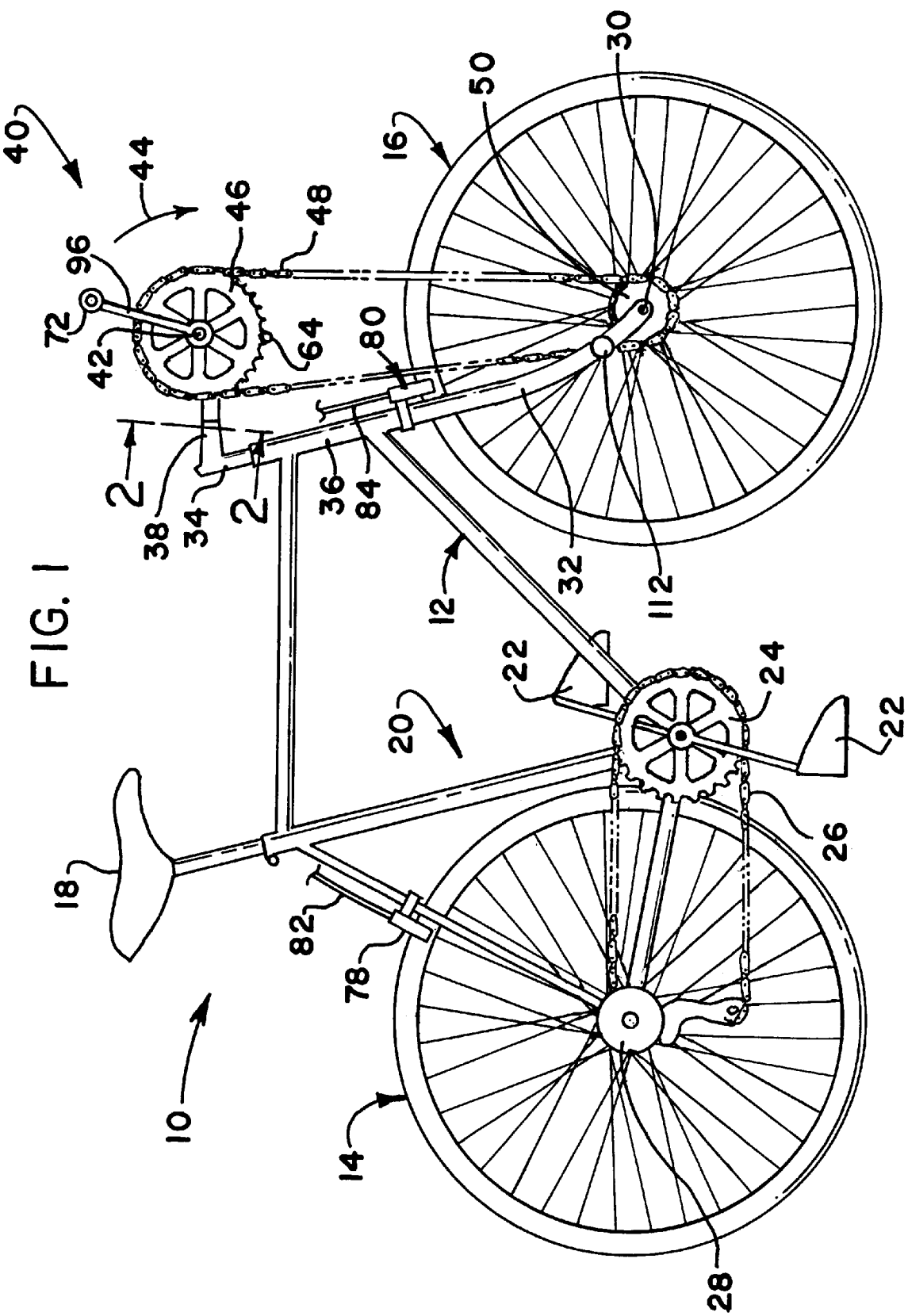
FIG. 1 is a simplified side elevational view of a bicycle incorporating both a conventional rear wheel drive and the novel front wheel drive mechanism of this invention.

The bicycle 10 of FIG. 1 includes a standard frame 12, a rear wheel 14 and a front wheel 16. A seat 18 is mounted essentially over a drive mechanism 20 for the rear wheel. The elements thus far described are all conventional and well known and need not be described in further detail, except to say that pedals 22 are pumped by the operator's legs to drive a sprocket 24 connected by a chain 26 to a driven sprocket 28 coaxial with the rear wheel 14. As is customary, the drive mechanism 20 is freewheeling so that pumping may be discontinued and the bicycle permitted to coast. The drive mechanism may be provided with any well known gear shifting transmission, but I prefer to utilize an automatic transmission such as the one shown in U.S. Pat. No. 4,598,920 on both the rear wheel and the front wheel. An automatic gear shift transmission is especially important for the front wheel to enable the bicycler to keep both hands on the steering mechanism at all times, including while the gears may be in the act of shifting.

In customary fashion, the front wheel 16 is journaled on an axle 30 supported at the lower end of a front wheel-supporting fork 32. The fork has a stem 34 at its upper end to serve as a journal for the fork 32 relative to a portion 36 of the frame 12. Stem 34 has a forwardly protruding arm 38 shown somewhat schematically in FIG. 2. The arm 38 serves as the primary support for the combination steering and drive mechanism 40. The mechanism 40 may at times be referred to as handlebars when its function is for steering or as a crank or drive mechanism whenever its function is to impart driving motion to the front wheel. It may be called either one when performing the functions of driving and steering at the same time, an important advantage of my invention. When mechanism 40 is used to drive the front wheel 16, a cross shaft 42 is rotated by the operator's arms in the direction of arrow 44 in FIG. 1. A drive sprocket 46 fixed to cross shaft 42 drives a chain 48, and through the chain imparts torque through rotary motion for a full 360 degrees to a driven sprocket 50 coaxially mounted to the front wheel. The front wheel is freewheeling and is preferably provided with an automatic transmission. To date, I have utilized a three speed transmission for the front wheel and a seven speed transmission for the rear wheel. I have not yet determined whether there is any synergistic effect between the drives, but suspect that such is available from use of the combination of the two drives, particularly where both transmissions are automatic and gear shifting is responsive to the actual centrifugal force resulting from the speed at which the wheels are rotating.

Figure 2:
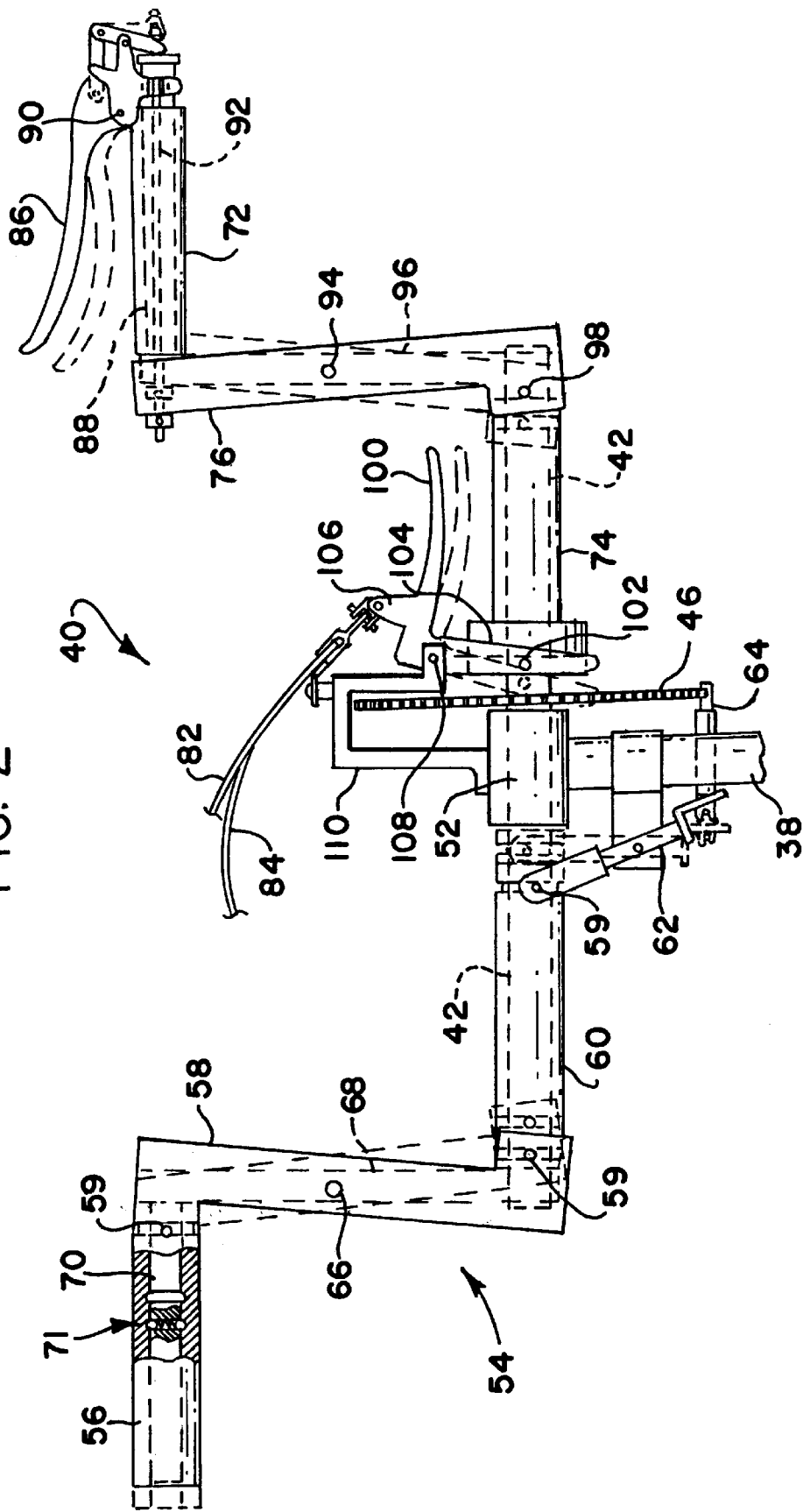
FIG. 2 is a view of the handlebar/crank mechanism of the present invention taken looking in the general direction from the bicycler's seat along lines 2—2 of FIG. 1.

Referring now to the details of my improvements of FIG. 2, the cross shaft 42 is journaled in a boss 52 located at the end of the arm 38 and providing a bearing surface for the cross shaft. To the left of the boss 52 is a clutch operating mechanism 54, consisting of an outboard axially-slidable hand grip 56, a square tube lever 58, an inboard axially-slidable hand grip 60, a clutch pin shifting lever 62, and a clutch pin 64. The lever 58 is pivoted about a pin 66 in a crank arm 68 fixed to the left end of the cross shaft 42. Crank arm 68 is located within the tubular lever 58, with the pin 66 protruding from opposite sides thereof to support the lever 58 in trunnion-like fashion. The hand grip 56 is axially slidable between its full line position in which the clutch pin 64 is engaged between adjacent teeth of the sprocket 46 to prevent driving of the sprocket 46, and its dotted line position which is slightly to the left of an axle 70 extending outwardly from the distal end of the crank arm 68. The hand grip 56 and the axle 70 are provided with a ball detent system 71 incorporating a pair of laterally offset circumferential grooves and a spring-loaded ball to maintain the hand grip in its last-actuated solid or dotted line position. At the inner end of hand grip 56 and at both the inner and outer ends of hand grip 60, the grips are circumferentially grooved to cooperate with inwardly-directed trunnion pins 59 at opposite ends of lever 58 and at the upper end of lever 62. The pin and groove connections allow the hand grips 56 and 60 to rotate freely relative to the axle 70 and cross shaft 42 while the front wheel is being driven. The handlebar 40 can be steered while holding either the grip 56 and a corresponding outboard hand grip 72 at the right side thereof or can be steered from the inboard hand grip 60 and a corresponding inboard hand grip 74 at the opposite end of the cross shaft 42. Although sliding of either grip 56 or 60 can theoretically operate the clutch pin 64 between its clutching and declutching positions, only outboard grip 56 is used for that purpose. Disengaging the clutch is necessary only when the handlebars are gripped at the outboard position and the person is ready to commence arm cranking. Reengaging the clutch is necessary only when the bicycler is about to discontinue arm cranking and wishes to set the position of the handlebars in a location of comfort.

As one is riding along and not powering the bicycle from the front wheel drive, the handlebars 40 can be positioned angularly in as many different locations about the axis of sprocket 46 as there are spaces between adjacent teeth of the sprocket. For example, FIG. 1 shows the crank arms at about the one o'clock position. With pin 64 declutched from the teeth of the sprocket 64, the crank arms can be located wherever one wants and the grips 56 or 60 slid in the appropriate direction to reengage the pin 64 with the sprocket 46. The handlebars can be left in their new angular location according to the desires of the bicyclist. When again wishing the use the arms and hands to drive the front wheel, it is a simple matter to disengage the clutch pin 64 from the sprocket and reinitiate front wheel driving. Since both front and rear wheels are freewheeling, when the sprocket 46 is locked in the clutched position, the front wheel rotates.

At the right side of the handlebars 40 with respect to the arm 38 as viewed in FIG. 2, the structure is generally a mirror image of the left side, with certain elements operating similarly. The functions performed are substantially different, however. While the levers 58 and 62 and hand grips 56 and 60 perform a clutch-operating function, the corresponding hand grip 72, lever 76 and the hand grip 74 are operated to brake the bicycle's forward motion. As seen in FIG. 1, conventional caliper brakes 78 and 80 operated by their respective cables 82 and 84 apply pressure to rims supporting the bicycle tires whenever a brake lever handle such as 86 (FIG. 2) is squeezed relative to its associated hand grip 72. Cables 82 and 84 can be seen at the center of FIG. 2, and their operation will now be described.

As the bicycler is riding along, if the sprocket 46 is in a driving condition and the arms are cranking the mechanism, gripping of hand grips 72 and 56 permits hand grip rotation about the axle 70 and a corresponding axle 88 which revolve with their respective crank arms. The hand on the right hand grip 72 may also be about the brake lever handle 86 without pressure or can be ready to be placed about the handle 86 if the need for braking is foreseen. As squeeze is applied, in conventional fashion the handle 86 pivots about a pin 90 and pulls rightwardly on a cable or rod 92 passing centrally through an axial opening in the shaft 88. The pull rocks the lever 76 clockwise about a cross pin 94 mounted in a crank arm 96 similar to the pin 66 in crank arm 68. In response to this motion, a pair of inwardly-facing pins 98 in the lower extension of the lever 76 push leftwardly on the right end of the hand grip 74, which grip is capable of sliding on the cross shaft. The leftward motion of hand grip 74 imparts a pivoting of a second brake lever handle 100 through pins 102 and lever 104. This causes actuation of the cables 82 and 84 as lever 106 rocks about pivot pin 108 mounted on a bracket 110 fixed to a stationary part of the steering mechanism, e.g., boss 52. It can thus be seen that the brakes can be applied from handle 86 if the bicycle is being steered from the outboard hand grips 56 and 72, or the handle 100 can be operated if the inboard hand grips 60 and 74 are being utilized for steering. In the latter instance, the hand grip 74 is not slid leftwardly and the lever 76 stays in its solid line position.

What has thus been described is a front wheel drive mechanism with braking, and clutching controls which enable the rider to use standard braking techniques whether using the right hand inboard or outboard hand grips, and clutching and declutching the drive mechanism from the left hand outboard grip, without ever having to release the steering system. If automatic transmissions are employed for both the front and rear wheels, the bicycler needs to be concerned only with the clutching and declutching of the front wheel drive and the placement of the handlebars in a preselected operating position. All of this can be accomplished without ever having to release control of the steering system.

While I have described my invention in connection with a bicycle, it is obviously applicable also to a tricycle. It is likewise applicable to a so-called tandem bicycle where the person up front does the steering and can crank the front wheel with his or her arms. To enable that person to remove his or her feet from the pedals, posts 112 can be provided at the lower end of the fork for supporting the legs and feet while pumping solely with the arms. Such posts 112 can also be provided if desired on the two wheeled unit shown in the drawings. They provide a means for the operator to brace himself or herself when cranking the front wheel alone. Bracing is of particular value during the lower, return part of a rotary stroke, much like a person in a rowboat braces his or her feet when pulling on the oars to utilize both the arms and legs during pulling.

Various other changes may be made without departing from the spirit and scope of the claims.

Having described my invention, I claim:

1. A bicycle having a frame, a rear wheel, a front wheel, a fork straddling and rotatably supporting said front wheel at its lower end, which fork has a stem at its upper end for pivotally mounting said fork in said frame to enable steering of said front wheel about said stem, a first chain-and-sprocket drive mechanism for driving said rear wheel by alternate pumping of a bicycler's legs and feet, a second chain-and-sprocket drive mechanism for driving said front wheel by simultaneous cranking of the bicycler's arms and hands in unison in the same direction, each of said wheels being provided with means enabling freewheeling forward movement whenever coasting during discontinuation of pumping of either the bicycler's legs or arms while providing positive forward driving of either wheel in response to pumping action of the legs or cranking action of the arms, brake means for selectively applying a braking force to said wheels, the first and second drive mechanisms for said wheels being independent whereby the bicycle may be driven by leg pumping alone, arm cranking alone or simultaneous leg pumping and arm cranking together, said second drive mechanism comprising:

a bearing surface extending perpendicularly relative to said stem toward opposite sides of said frame;

a through cross shaft rotatably journaled in said bearing surface, said cross shaft extending outwardly from opposite sides of said stem a distance sufficient for said second chain-and-sprocket drive mechanism to extend outboard of said stem and fork between the cross shaft and the axis of said front wheel;

a drive sprocket fixed to said cross shaft;

a driven sprocket mounted coaxially and in driving relationship with said front wheel;

a chain interconnecting said drive sprocket and said driven sprocket, said sprockets and chain being so mounted relative to said fork and stem as to enable pivotal movement of said second drive mechanism with said fork as said stem is pivoted to steer the bicycle during cycling;

left and right crank arms extending generally radially in the same general direction from opposite ends of said cross shaft;

an outwardly-directed axle at the distal end of each crank arm and a freely rotatable hand grip journaled on each axle;

clutch means fixedly mounted relative to said frame for selectively locking and unlocking said cross shaft and second drive mechanism with respect to said frame and thereby respectively inhibiting or enabling driving of said front wheel; and means for operating said clutch means between its locking and unlocking conditions, the improvement comprising said clutch operating mechanism including means mounting one of said hand grips for axial sliding movement relative to its axle, and interconnecting means intermediate said one hand grip and said clutch means and at least a portion of which interconnecting means is mounted on the crank arm adjacent said one hand grip, said interconnecting means including means for enabling free rotation of said one hand grip relative to its axle to enable simultaneous steering control of the bicycle from said one hand grip and operating said clutch means between its locking and unlocking conditions while driving said front wheel.

2. The invention according to claim 1 wherein said clutch means includes a slidable pin mounted to move with said stem during steering, said pin, when in locking condition, engaging with a space between two adjacent teeth of said drive sprocket in an area thereof not encompassed by said chain.

3. The invention according to claim 2 wherein said cross shaft comprises a portion of steering mechanism connected to said stem, and wherein said pin is operatively connected to an actuating mechanism associated with said steering mechanism.

4. The invention according to claim 1 wherein a wheel brake operating mechanism is provided adjacent the other of said hand grips, said wheel brake operating mechanism being located in a position to be hand-squeeze actuated while the bicycler has a hand on said other hand grip for enabling two handed steering of the front wheel.

5. The invention according to claim 4 wherein said cross shaft extends outwardly of said stem a distance sufficient to enable placement of the bicycler's hands thereon for steering the bicycle directly from said cross shaft whenever said pin is clutched relative to said cross shaft.

6. The invention according to claim 5 wherein a second set of hand grips is mounted on said cross shaft, thereby also enabling gripping of the handlebar from said second set of hand grips for steering the front wheel.

7. The invention according to claim 6 wherein said wheel brake operating mechanism includes a first operating lever operated from said other said hand grip on an axle and a second operating lever operated from the other cross shaft hand grip on the same side of said handlebar.

8. The invention according to claim 7 wherein a third lever is pivotally mounted on the crank arm intermediate the first and second levers, and wherein said second lever is operatively associated with said first lever through said third lever whereby actuation of said first lever by a hand on said other hand grip physically operates through said third lever and said second lever to actuate said brake operating mechanism.

9. The invention according to claim 8 wherein the hand grip on said cross shaft adjacent said second lever is freely rotatably and slidably mounted on said cross shaft, and wherein said third lever actuates said cross shaft hand grip in an axial direction to operate said second lever to brake the bicycle.

10. The invention according to claim 1 wherein said interconnecting means comprises a clutch operating lever, a pivot pin pivotally mounting the clutch operating lever on its respective crank arm, said pivot pin being located on the crank arm between the slidable hand grip and the cross shaft, a sleeve rotatably surrounding the cross shaft and being axially slidable relative thereto, and interconnections between said slidable hand grip, clutch operating lever and sleeve for imparting sliding motion therebetween for moving said slidable pin between its clutching and declutching positions.

11. The invention according to claim 10 wherein said sleeve comprises a hand grip of a second set of hand grips surrounding said cross shaft and rotatable relative thereto.

12. The invention according to claim 11 wherein said slidable pin is operable independently from the slidable hand grip on said axle, whereby both steering of the handlebar and clutching and declutching of the slidable pin can both be accomplished while the hands are on the outboard set of hand grips.

13. The invention according to claim 2 wherein said cross shaft and crank arms are selectively incrementally positionable in as many different angular positions as there are spaces between adjacent teeth of said drive sprocket, whereby, when said slidable pin is in clutching position and said crank arms serve only to steer the front wheels by means of said axles without driving the front wheel, said axles may be located in any convenient angular location about the cross shaft.

14. A bicycle having a frame, a rear wheel, a front wheel, a fork straddling and rotatably supporting said front wheel at its lower end, which fork has a stem at its upper end for pivotally mounting said fork in said frame to enable steering of said front wheel about said stem, a first chain-and-sprocket drive mechanism for driving said rear wheel by alternate pumping of a bicycler's legs and feet, a second chain-and-sprocket drive mechanism for driving said front wheel by simultaneous cranking of the bicycler's arms and hands in unison in the same direction, each of said wheels being provided with means enabling freewheeling forward movement whenever coasting during discontinuation of pumping of either the bicycler's legs or arms while providing positive forward driving of either wheel in response to pumping action of the legs or cranking action of the arms, hand-operable brake means for selectively applying a braking force to said wheels, the first and second drive mechanisms for said wheels being independent whereby the bicycle may be driven by leg pumping alone, arm cranking alone or simultaneous leg pumping and arm cranking together, said second drive mechanism comprising:

a bearing surface extending perpendicularly relative to said stem toward opposite sides of said frame;

a through cross shaft rotatably journaled in said bearing surface, said cross shaft extending outwardly from opposite sides of said stem a distance sufficient for said second chain-and-sprocket drive mechanism to extend outboard of said stem and fork between the cross shaft and the axis of said front wheel;

a drive sprocket fixed to said cross shaft;

a driven sprocket mounted coaxially and in driving relationship with said front wheel;

a chain interconnecting said drive sprocket and said driven sprocket, said sprockets and chain being so mounted relative to said fork and stem as to enable pivotal movement of said second drive mechanism with said fork as said stem is pivoted to steer the bicycle during cycling;

left and right crank arms extending generally radially in the same general direction from opposite ends of said cross shaft;

an outwardly-directed axle at the distal end of each crank arm and a freely rotatable hand grip journaled on each axle; the improvement comprising:

said hand-operable brake means including a caliper brake for applying a braking force to at least one of said front and rear wheels, a brake-actuating lever pivotally mounted on a pivot pin which is fixed relative to said frame adjacent said steering mechanism, and an operating cable intermediate a distal end of said brake-operating lever and said caliper brake;

a hand-squeezable brake lever handle operable by a hand on one of said hand grips while steering said bicycle; and interconnecting means mounted on and movable with that crank arm adjacent the brake lever handle, said interconnecting means operating the brake-actuating lever from said brake lever handle when squeezed to apply braking force to a wheel.

15. The invention set forth in claim 14 wherein said interconnecting means is mounted on said that crank arm for rotating therewith and with said cross shaft while driving and steering said front wheel from said second driving mechanism.

16. The invention set forth in claim 14 wherein said interconnecting means comprises a lever pivotally mounted on said that crank arm, and a sleeve mounted to be slidable on the cross shaft and slid to operate said brake-actuating lever in response to pivoting of said pivotally-mounted lever when squeeze pressure is applied to said brake handle lever.

17. The invention set forth in claim 16 wherein said sleeve comprises a hand grip for also enabling steering of the bicycle from the cross shaft.

18. The invention set forth in claim 17 wherein the axle for the hand grip is hollow, wherein the lever pivotally mounted on the crank arm is actuated by an element passing through the axle and wherein the brake lever handle provides a pulling force on said element when said brake lever handle is squeezed.

* * * * *